United States Patent
Smith et al.

(10) Patent No.: US 7,568,523 B2
(45) Date of Patent: Aug. 4, 2009

(54) TREATMENT OF CESIUM-CONTAINING FLUIDS

(75) Inventors: Kevin W. Smith, Houston, TX (US); Robert L. Sloan, Katy, TX (US); Harry D. Smith, Jr., Montgomery, TX (US)

(73) Assignee: Total Separation Solutions, LLC, Houston, TX (US)

( * ) Notice: Subject to any disclaimer, the term of this patent is extended or adjusted under 35 U.S.C. 154(b) by 323 days.

(21) Appl. No.: 11/703,950

(22) Filed: Feb. 8, 2007

(65) Prior Publication Data
US 2007/0193738 A1    Aug. 23, 2007

(51) Int. Cl.
*E21B 43/40* (2006.01)
(52) U.S. Cl. .................. 166/267; 166/302; 175/66; 210/737; 210/738; 210/747
(58) Field of Classification Search ............... None
See application file for complete search history.

(56) References Cited

U.S. PATENT DOCUMENTS

| | | |
|---|---|---|
| 3,047,434 A | 7/1962 | Bulat |
| 3,944,548 A | 3/1976 | Manganaro |
| 5,188,090 A | 2/1993 | Griggs |
| 5,385,298 A | 1/1995 | Griggs |
| 5,472,620 A | 12/1995 | Huang |
| 5,957,122 A | 9/1999 | Griggs |
| 6,015,535 A | 1/2000 | Brown |
| 6,077,431 A * | 6/2000 | Kawanishi et al. .......... 210/609 |
| 6,177,014 B1 | 1/2001 | Potter |
| 6,436,879 B1 | 8/2002 | Brown |
| 6,627,784 B2 | 9/2003 | Hudson |
| 6,666,906 B2 * | 12/2003 | Hallman .................. 95/52 |
| 7,201,225 B2 * | 4/2007 | Smith et al. ............ 166/250.01 |

* cited by examiner

*Primary Examiner*—George Suchfield
(74) *Attorney, Agent, or Firm*—William L. Krayer (57) ABSTRACT

Cesium solutions are treated in a cavitation device to increase their temperature and facilitate the removal of water from them. The context is normally an oil well fluid or a mining solution. The concentrated solutions can be reused, in the case of oil well fluids, or more easily handled for recovery of the elemental cesium or cesium in the form of a salt. Thermal energy is saved by using the concentrate or the water vapor to heat various streams within the system.

14 Claims, 3 Drawing Sheets

TREATMENT OF CESIUM-CONTAINING FLUIDS

RELATED APPLICATION

This application claims the full benefit of copending application Ser. No. 11/352,889, filed Feb. 13, 2006, which in turn claims the benefit of provisional applications 60/652,549 filed Feb. 14, 2005 and 60/652,711 filed Feb. 14, 2005.

TECHNICAL FIELD

A cavitation device (shockwave power reactor) is used to prepare oil well completion and workover fluids containing cesium, using spent, used, or dilute fluids containing cesium, which commonly contain solids and other dissolved materials. The prepared solutions contain recycled cesium in the form of dissolved cesium formate, dissolved cesium chloride, or other dissolved cesium salts in concentrations useful for achieving a desired density for use in regenerated completion and workover fluids.

BACKGROUND OF THE INVENTION

In oil and other hydrocarbon production operations, completion, drilling and workover fluids are typically circulated down the string of tubes and upwards around the outside of the tubes, contacting the formation surface of the wellbore from which the hydrocarbons are to be produced. Part of the fluid may be lost into the formation, and frequently the fluid is diluted by indigenous fluid entering from the formation. The salts and other additives in the completion or workover fluid are either partially lost or diluted, or both, as a result of contact with the formation. It is desirable in many instances to use additives which contribute a degree of density to the completion or workover fluid; that is, a dense brine will be able more efficiently to remove loose rock and sand, for example, which otherwise might clog the perforations in the pipe, thus impeding hydrocarbon production. As a relatively heavy alkali metal, cesium works well as a densifying agent in completion and workover fluids, but it is expensive, and, as with any other material which must ultimately be disposed of, should be recycled to the extent reasonably possible. This invention is directed specifically to the recycling of cesium as a densifying agent in completion, drilling and workover fluids and to similar treatment of solutions of cesium obtained in the mining of cesium.

As used herein, the term "heavy brine components" means calcium, zinc, ammonium and/or cesium as cations and chloride, formate and particularly bromide as anions from any source. Typical sources include cesium chloride or formate, calcium chloride, sodium chloride, sodium bromide, calcium bromide, zinc chloride, zinc bromide, ammonium chloride, and mixtures thereof as well as their cation and anion forming moieties from other sources.

Many oil well fluids contain polymers added for various purposes including to increase viscosity to help remove solids from the well and to retard the fluid loss into the formation. Polymers may be considered contaminants for various types of recycling, and in any event are difficult to remove, particularly when they are present with substantial quantities of solids.

Oil well muds generally include large proportions of solids, making their disposal difficult; also they contain additives which are beneficially recovered and recycled. Disposal is also difficult for other common oil well fluids such as water/oil (or oil/water) emulsions of widely varying composition including muds; recovering the more valuable components of emulsions for recycling or other use has been very difficult.

Not least among the difficulties of dealing with dilute, spent or used oil well fluids is the mundane but expensive task of trucking the fluids from remote producing wells to distant environmentally approved disposal sites or processing plants. Quite apart from the utter waste of materials, the cost of hauling dilute brines and other oil well fluids for disposal is a serious counterproductive burden to the producer. A related point is that if the excess water in dilute fluids is not eliminated or recovered for various purposes, the volume of fluid at the wellsite continues to increase, requiring more and more additives to render it useful. Such additions are costly, as are the facilities necessary to store the additional fluid.

As our invention is capable of concentrating and remediating any or all of the above described oil well fluids—brines, heavy brines, polymer-containing fluids, completion and workover fluids, drilling fluids, muds, and emulsions—we may refer to these collectively herein as "oil well fluids." Similar fluids are used in the production of natural gas in gas wells, and accordingly we intend to include such fluids in the term oil well fluids. Oil well fluids generally may include high solids contents, but muds in particular may include solids commonly in the range of up to about 45% by volume. Such high solids content is detrimental to any conventional distillation process which might be considered to treat an oil field mud for recycling. Likewise emulsions are not conducive to conventional distillation as a separate procedure. Conventional distillation methods of concentrating dilute and particularly contaminated solutions including heavy brine components result in scaling and other difficulties which ultimately frustrate the economics of recycling. A more economical method is needed for recycling the components of oil well fluids.

Common alkali metal salts such as sodium or potassium chloride, bromide or formate have long been used in oil well completion, drilling and workover fluids (collectively herein called oil well fluids). The more unusual cesium salts have been found particularly useful where a denser fluid is needed. Conventional distillation methods of concentrating dilute and particularly contaminated solutions of cesium salts result in scaling and other difficulties which ultimately frustrate the economics of recycling.

Because of the particular difficulties of handling and dewatering cesium solutions, and because of their expense and the unique environmental aspects of cesium, this application is directed specifically to the concentration of cesium solutions and recycling where appropriate. A more economical method of recycling cesium is needed for oil well fluids.

SUMMARY OF THE INVENTION

This invention regenerates dilute and contaminated cesium solutions by passing them through a cavitation device which generates shock waves to heat the solution and remove moisture, thereby concentrating the solution and any small solids present. Preferably the cavitation device is one manufactured and sold by Hydro Dynamics, Inc., of Rome, Ga., most preferably the device described in U.S. Pat. Nos. 5,385,298, 5,957,122 6,627,784 and particularly 5,188,090, all of which are incorporated herein by reference in their entireties. In recent years, Hydro Dynamics, Inc. has adopted the trademark "Shockwave Power Reactor" for its cavitation devices, and we use the term SPR herein to describe the products of this company and other cavitation devices that can be used in our invention.

The solution may be treated with similar or other additives to achieve a desired density, crystallization temperature, or an appropriate or desired balance with other cations and anions.

Unlike a conventional distillation process, the shockwave power reactor (SPR) preserves the ratios of the cations and anions, and solids, in the solution to each other, while simply removing water. A conventional distillation process would tend to scale out some of the constituents. This ability can be used to provide greater control over the process of reconstituting oil well completion and workover fluids.

Our invention includes the step of filtering the fluid prepared by the cavitation device. Typically, the dilute, contaminated, or used oil well fluids are filtered before they are stored or processed by distillation. Our invention renders the filtration process more efficient by postponing it until after the used fluid is passed through the cavitation device. Thus our invention includes a process of preparing a recycled cesium-containing oil well fluid comprising passing the fluid through a cavitation device and then filtering it.

In one aspect, our invention comprises passing the cesium-containing fluid through a cavitation device and then filtering the fluid thus concentrated. A conventional distillation process will generally be preceded by filtration in order to minimize the scaling and deposition effects incident to the presence of undissolved solids. Because the cavitation device will operate with as high as 80% solids, filtration can be performed more efficiently on the smaller volumes obtained after passing through the cavitation device.

Our invention includes a method of treating a downhole formation comprising introducing into a well an oil well fluid containing cesium, whereby the fluid becomes diluted so that it contains less than the desired concentration of cesium, circulating the fluid from the well, and passing at least a portion of the fluid through a cavitation device to remove moisture therefrom and produce a regenerated fluid containing a higher concentration of cesium in said fluid. Commonly the oil well fluid will contain at least 2.5% cesium by weight. Our invention will restore the concentration of one which has been diluted by circulating in the well bore and/or contact with the formation—that is, it may be restored to 2.5% or higher.

SUMMARY OF THE INVENTION

This invention treats dilute and contaminated solutions and slurries, particularly such solutions and slurries containing cesium, by passing them through a cavitation device to facilitate the removal of water.

Unlike a conventional distillation process, the SPR preserves the ratios of the cations and anions, as well as the solids, to each other in the solution that enters the SPR, while facilitating the removal of water. A conventional distillation process would tend to scale out some of the constituents in more or less difficulty predictable portions and relationships. The fact that in our process the ratios of the non-aqueous components remain essentially the same can be used to provide greater control over the process of reconstituting oil well completion and workover fluids. Either before or after passing through the SPR, the solution may be treated with additives to restore the original density, crystallization temperature, or balance of cations and anions, or to adjust the individual concentrations of components to respond to new conditions found in the well. Since the operator may rely on the SPR to preserve the ratios of the solid and dissolved components to each other in the fluid that enters the SPR, any distortion of the ratios caused by the formation or wellbore can be adjusted or compensated for either before the fluid enters the SPR or after it leaves, without concern for a further distortion of the ratios caused by the SPR. This would not be the case with any device or process step that might result in scaling. If the conserved components are to be used in a different well requiring different ratios of components to each other, the operator again may rely on the SPR not to alter the existing ratios, and make any necessary adjustments accordingly.

Definition: We use the term "cavitation device," or "SPR," to mean and include any device which will impart thermal energy to flowing liquid by causing bubbles or pockets of partial vacuum to form within the liquid it processes, the bubbles or pockets of partial vacuum being quickly imploded and filled by the flowing liquid. The bubbles or pockets of partial vacuum have also been described as areas within the liquid which have reached the vapor pressure of the liquid. The turbulence and/or impact, which may be called a shock wave, caused by the implosion imparts thermal energy to the liquid, which, in the case of water, may readily reach boiling temperatures. The bubbles or pockets of partial vacuum are typically created by flowing the liquid through narrow passages which present side depressions, cavities, pockets, apertures, or dead-end holes to the flowing liquid; hence the term "cavitation effect" is frequently applied, and devices known as "cavitation pumps" or "cavitation regenerators" are included in our definition. Steam generated in the cavitation device can be separated from the remaining, now concentrated, water and/or other liquid which frequently will include significant quantities of solids small enough to pass through the reactor. The term "cavitation device" includes not only all the devices described in the above itemized U.S. Pat. Nos. 5,385,298, 5,957,122 6,627,784 and 5,188,090 but also any of the devices described by Sajewski in U.S. Pat. Nos. 5,183,513, 5,184,576, and 5,239,948, Wyszomirski in U.S. Pat. No. 3,198,191, Selivanov in U.S. Pat. No. 6,016,798, Thoma in U.S. Pat. Nos. 7,089,886, 6,976,486, 6,959,669, 6,910,448, and 6,823,820, Crosta et al in U.S. Pat. No. 6,595,759, Giebeler et al in U.S. Pat. Nos. 5,931,153 and 6,164,274, Huffman in U.S. Pat. No. 5,419,306, Archibald et al in U.S. Pat. No. 6,596,178 and other similar devices which employ a shearing effect between two close surfaces, at least one of which is moving, such as a rotor, and/or at least one of which has cavities of various designs in its surface as explained above.

Our invention includes the optional step of filtering the fluid prepared by the SPR. Typically, in the prior art, the dilute, contaminated, or used oil well fluids are filtered before they are stored or processed by distillation. Our invention enables the postponement of filtration until after the used fluid is concentrated by passing through the SPR to heat it and facilitate removal of vapor from a flash tank or a vent; filters and the filtration process can therefore be engineered more efficiently to handle smaller volumes of liquid with higher concentrations of solids. Thus our invention includes a process of preparing a recycled oil well fluid comprising passing the fluid through a cavitation device and then filtering the concentrated fluid thus obtained. Persons skilled in the art will readily see that filtering significant quantities of solids after water removal rather than before contrasts dramatically with a distillation process. Of course it may be desirable in some cases to filter before passing the fluid into the SPR, or to filter both before and after.

It will be seen that our invention includes a method of conserving components of a used oil well fluid containing oil well fluid components comprising (a) concentrating said oil well fluid by passing said oil well fluid through a cavitation device to heat the fluid and facilitate removal of vapor or moisture therefrom and to obtain a concentrated oil well fluid containing oil well fluid components in concentrations higher than said used oil well fluid, (b) optionally adjusting the composition of said concentrated oil well fluid by adding at least one moiety, increment, or amount of at least one component of said concentrated oil will fluid to increase the concentration thereof in said concentrated oil well fluid, and (c) reusing the concentrated oil well fluid so adjusted. By a moiety, we mean an additive amount, i.e. any additional amount of the component in question.

Our invention also includes a method of conserving components of a used oil well fluid containing oil well fluid components comprising (a) concentrating said oil well fluid by passing said oil well fluid through a cavitation device to obtain a concentrated oil well fluid containing oil well fluid components in concentrations higher than said used oil well fluid, (b) filtering the composition of said concentrated oil well fluid, and (c) reusing the concentrated oil well fluid.

In another aspect, our invention includes a method of processing a used oil well fluid comprising optionally filtering said used oil well fluid, passing the used oil well fluid through a heat exchanger utilizing waste heat from a power source such as the exhaust of a Diesel engine, powering a cavitation device with the power source, passing the oil well fluid through the cavitation device to increase the temperature thereof, optionally recycling at least some of said used oil well fluid through said cavitation device to further increase the temperature of said used oil well fluid, passing said used oil well fluid into a flash tank to separate steam and vapor from said used oil well fluid and to obtain a concentrated fluid, removing at least a portion of said concentrated fluid from said flash tank, and reusing said at least a portion of said concentrated fluid in an oil well. The use of a Diesel engine is not essential; persons skilled in the art will realize that the cavitation device may be powered by any more or less equivalent source of mechanical energy, such as a common internal combustion engine, a steam engine, an electric motor, or the like. Waste heat from any of these, either in an exhaust gas or otherwise, may be utilized in a known manner to warm the oil well fluid before or after passing it through the SPR.

While the SPR is quite capable of elevating the temperature of an aqueous solution or slurry to the boiling point (at atmospheric pressure) of water or higher, it is not essential in our process for it to do so, as the flash tank may be operated under a vacuum to draw off vapors at temperatures below the boiling point of water at atmospheric pressure.

Also, our invention includes a method of upgrading a cesium containing solution comprising passing said cesium containing solution through a cavitation device to remove water therefrom, thereby obtaining a solution containing a higher concentration of cesium.

DETAILED DESCRIPTION OF THE INVENTION

Figure 1A:
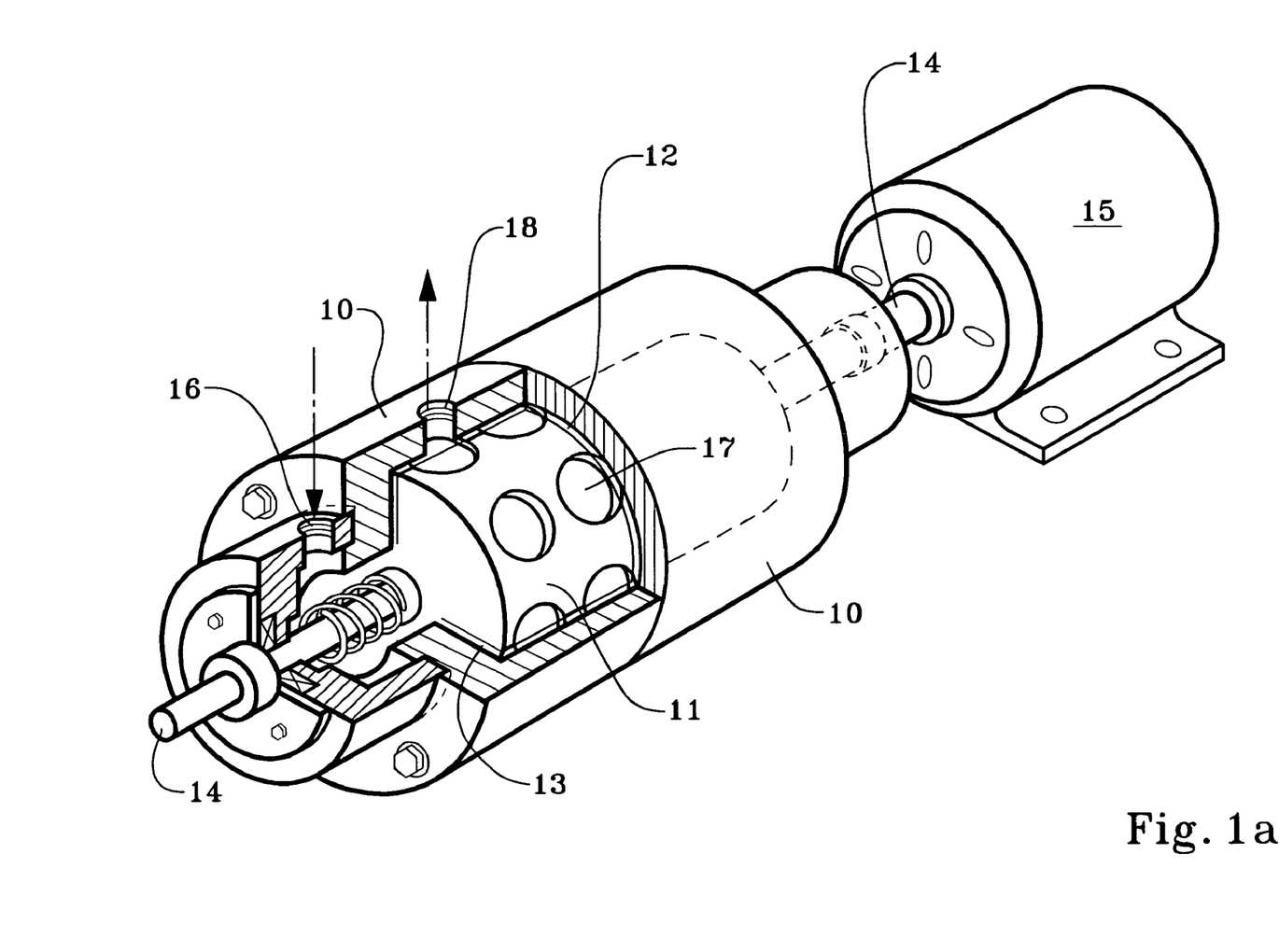
FIGS 1a and 1b show variations of a cavitation device as utilized in our invention.
Figure 1B:
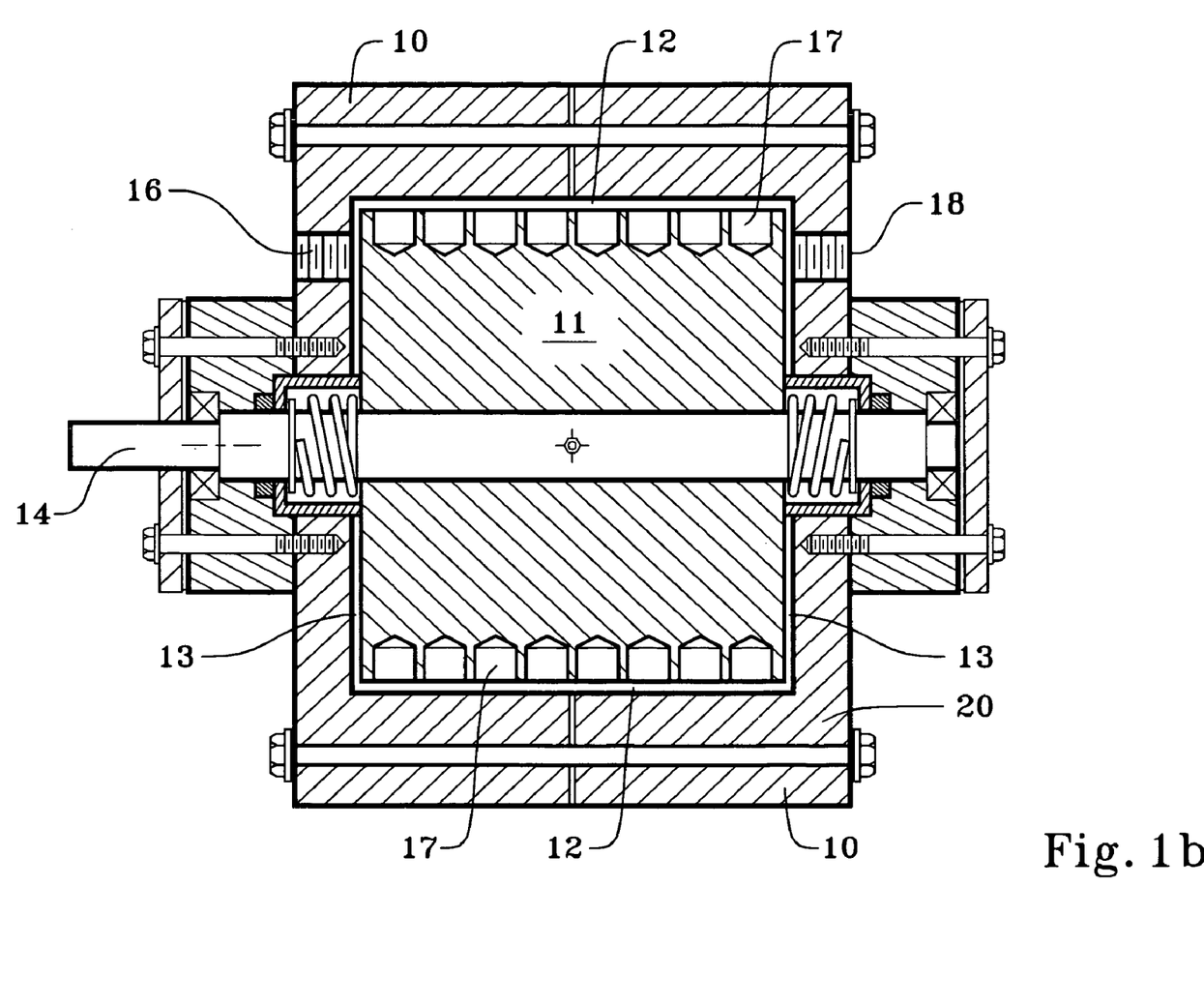

FIGS. 1a and 1b show two slightly different variations, and views, of the cavitation devices sometimes known as a cavitation pump, or a cavitation regenerator, and sometimes referred to herein as an SPR, which we use in our invention to regenerate solutions comprising heavy brine components.

FIGS. 1a and 1b are taken from FIGS. 1 and 2 of Griggs U.S. Pat. No. 5,188,090, which is incorporated herein by reference along with related U.S. Pat. Nos. 5,385,298, 5,957, 122, and 6,627,784. As explained in the U.S. Pat. No. 5,188, 090 and elsewhere in the referenced patents, liquid is heated in the device without the use of a heat transfer surface, thus avoiding the usual scaling problems common to boilers and distillation apparatus.

A housing 10 in FIGS. 1a and 1b encloses cylindrical rotor 11 leaving only a small clearance 12 around its curved surface and clearance 13 at the ends. The rotor 11 is mounted on a shaft 14 turned by motor 15. Cavities 17 are drilled or otherwise cut into the surface of rotor 11. As explained in the Griggs patents, other irregularities, such as shallow lips around the cavities 17, may be placed on the surface of the rotor 11. Some of the cavities 17 may be drilled at an angle other than perpendicular to the surface of rotor 11—for example, at a 15 degree angle. Liquid (fluid)—in the case of the present invention, a solution containing heavy brine components, or a used mud emulsion, or a used workover fluid, for example,—is introduced through port 16 under pressure and enters clearances 13 and 12. As the fluid passes from port 16 to clearance 13 to clearance 12 and out exit 18, areas of vacuum are generated and heat is generated within the fluid from its own turbulence, expansion and compression (shock waves). As explained at column 2 lines 61 et seq in the U.S. Pat. No. 5,188,090, "(T)he depth, diameter and orientation of (the cavities) may be adjusted in dimension to optimize efficiency and effectiveness of (the cavitation device) for heating various fluids, and to optimize operation, efficiency, and effectiveness . . . with respect to particular fluid temperatures, pressures and flow rates, as they relate to rotational speed of (the rotor 11)." Smaller or larger clearances may be provided (col. 3, lines 9-14). Also the interior surface of the housing 10 may be smooth with no irregularities or may be serrated, feature holes or bores or other irregularities as desired to increase efficiency and effectiveness for particular fluids, flow rates and rotational speeds of the rotor 11. (col. 3, lines 23-29) Rotational velocity may be on the order of 5000 rpm (col 4 line 13). The diameter of the exhaust ports 18 may be varied also depending on the fluid treated. Pressure at entrance port 16 may be 75 psi, for example, and the temperature at exit port 18 may be 300° F. Thus the heavy brine components containing solution may be flashed or otherwise treated in the cavitation device to remove excess water as steam or water vapor. Note that the position of exit port 18 is somewhat different in FIGS. 1a and 1b; likewise the position of entrance port 16 differs in the two versions and may also be varied to achieve different effects in the flow pattern within the SPR.

Another variation which can lend versatility to the SPR is to design the opposing surfaces of housing 10 and rotor 11 to be somewhat conical, and to provide a means for adjusting the position of the rotor within the housing so as to increase or decrease the width of the clearance 12. This can allow for different sizes of solids present in the fluid, to reduce the shearing effect if desired (by increasing the width of clearance 12), to vary the velocity of the rotor as a function of the fluid's viscosity, or for any other reason.

Operation of the SPR (cavitation device) is as follows. A shearing stress is created in the solution as it passes into the narrow clearance 12 between the rotor 11 and the housing 10. This shearing stress causes an increase in temperature. The solution quickly encounters the cavities 17 in the rotor 11, and tends to fill the cavities, but the centrifugal force of the rotation tends to throw the liquid back out of the cavity, which creates a vacuum. The vacuum in the cavities 17 draws liquid back into them, and accordingly "shock waves" are formed as the cavities are constantly filled, emptied and filled again. Small bubbles, some of them microscopic, are formed and imploded. All of this stress on the liquid generates heat which increases the temperature of the liquid dramatically. The design of the SPR ensures that, since the bubble collapse and most of the other stress takes place in the cavities, little or no erosion of the working surfaces of the rotor 11 takes place, and virtually all of the heat generated remains within the liquid.

Temperatures within the cavitation device—of the rotor 11, the housing 10 and its metal wall 20, and the fluid within the clearance spaces 12 between the rotor and the housing—remain substantially constant after the process is begun and while the feed rate and other variables are maintained at the desired values. There is no outside heat source; it is the mechanical energy of the spinning rotor—to some extent friction, as well as the above described cavitation effect—that is converted to heat taken up by the solution and soon removed along with the solution when it is passes through exit 18. The rotor and housing indeed tend to be lower in temperature than the liquid in clearances 12 and 13. There is little danger of scale formation even with high concentrations of heavy brine components in the solution being processed.

Any solids present in the solution, having dimensions small enough to pass through the clearances 12 and 13 may pass through the SPR unchanged. This may be taken into account when using the reconstituted solution in for oil well purposes. On the other hand, subjecting the water-soluble polymers to the localized cavitation process and heating may break them down, shear them, or otherwise completely destroy them, a favorable outcome for many purposes. The condition known as "fish-eyes," sometimes caused by the gelling of water-soluble polymers, can be cured by the SPR. These effects will take place in spite of the possible presence of significant amounts of solids.

Concentrated and heavy or dense brines are more liable to crystallize in use than dilute brines, and accordingly their crystallization temperatures are of concern. The crystallization point of a highly salt-laden solution does not imply merely that a small portion of the salts may crystallize out, but that the entire solution will tend to gel or actually solidify, a phenomenon of great concern during the transportation of such solutions or in storage, for example. The ability to concentrate heavy brine components and their ratios to each other in a solution using a cavitation device leads to better control over crystallization temperature and the ability to achieve a good balance between crystallization temperature and density. Complex relationships between the concentrations and ratios of heavy brine component ions and other constituents in the solution rather precisely obtained by our invention means that the crystallization temperature of a completion or workover fluid can be more readily controlled while conserving substantially all of the components available to be saved. Our invention includes a method of achieving a desired crystallization temperature in a used oil well fluid containing cesium comprising passing said used oil well fluid through a cavitation device, thereby obtaining a rejuvenated oil well fluid having a concentration of cesium greater than that of said used oil well fluid, and adding at least one salt to said rejuvenated oil well fluid in an amount calculated to obtain a desired crystallization temperature in said rejuvenated oil well fluid.

The ability to concentrate heavy brine components content in a solution using a cavitation device also leads to better control over solution density. Relationships between the rather precisely obtained concentrations of heavy brine component ions and other constituents in the solution means that the density of a completion or workover fluid can be more readily matched with the density of the drilling fluid.

The ability to concentrate cesium content in a solution using a cavitation device leads to better control over solution density. Relationships between the rather precisely obtained concentrations of cesium ions and other constituents in the solution means that the density of a completion or workover fluid can be more readily matched with the density of the drilling fluid. The ability to concentrate cesium content in a solution using a cavitation device also leads to better control over crystallization temperature. As is known in the art of hydrocarbon production, downhole crystallization can be expensive and troublesome. The operator should be aware of downhole temperatures and should design the completion or workover fluid accordingly. Relationships between the rather precisely obtained concentrations of cesium ions and other constituents in the solution rejuvenated by our process means that the crystallization temperature of a completion or workover fluid can be more readily controlled. In another aspect, our invention includes filtering the fluid after it is passed through the cavitation device. In the prior art, where one wishes to store a cesium containing fluid or distill it to concentrate it, frequently the solution is filtered first. We can pass the fluid "as is" through the cavitation device, thus concentrating the solids along with the dissolved matter, which makes filtration more efficient in many instances. Density or crystallization temperature can be adjusted after filtration or before.

Where the fluid treated is a heavy brine containing cesium, it will commonly contain at least 2.5% cesium by weight. Our invention includes a method of treating a hydrocarbon producing formation comprising introducing into the formation through a well an oil well fluid containing at least 2.5% by weight cesium, whereby the fluid becomes diluted so that it contains less than 2.5% cesium by weight, circulating the fluid from the well, and passing at least a portion of the fluid through a cavitation device to remove moisture therefrom and produce a regenerated fluid containing at least 2.5% cesium by weight in said fluid.

Similar percentages may be found in cesium solutions used in mining cesium, and our invention may be quite useful for concentrating cesium solutions in cesium mining.

Figure 2:
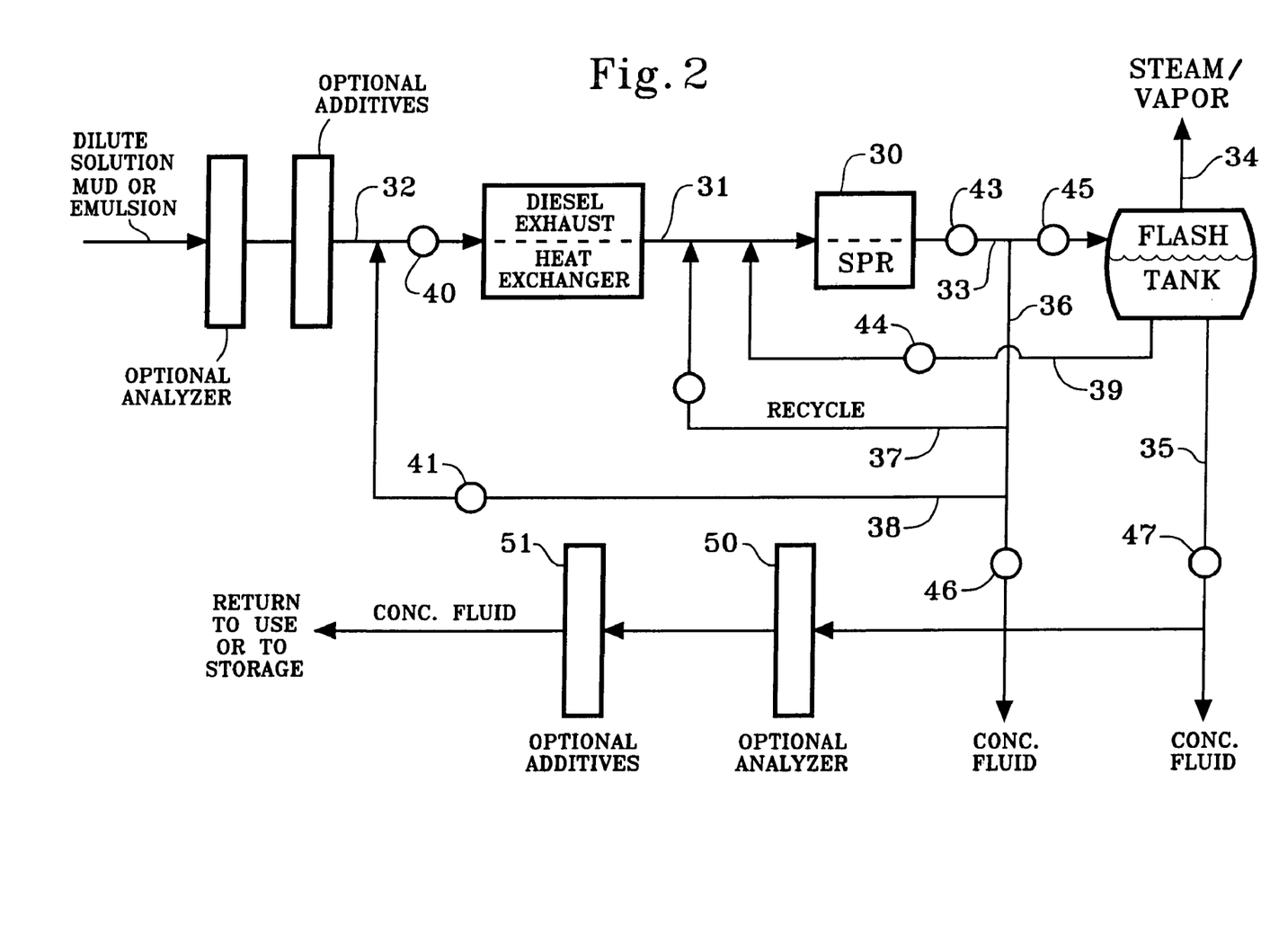
FIG. 2 is a flow sheet illustrating the process for concentrating an oil well fluid or other fluid.

In FIG. 2, the dilute solution, slurry or emulsion (hereafter sometimes a fluid) enters in line 32 from the left, as depicted. It may come directly from a well, from a hold tank, or indirectly from another source. The SPR (cavitation device) 30 requires a motor or engine to rotate it. Here, a Diesel engine or other power source, not shown, powers the SPR and generates hot exhaust gases, which are passed through the Diesel Exhaust Heat Exchanger or other waste heat source where Diesel power is not used, where the thermal energy of the exhaust gas is used to heat the incoming fluid in line 32 through a heat exchange surface or other conventional or expedient manner. Optionally the heat exchanger may be bypassed in a line not shown. The incoming fluid continues through line 31 to the SPR 30 which may be any cavitation device described above; for illustrative purposes, it may be substantially as shown in FIGS. 1a and 1b. A supplemental pump, not shown, may assist the passage of the fluid. In the SPR 30, the fluid is heated as described with reference to FIGS. 1a and 1b, and the heated fluid is passed through line 33 to a (labeled) flash tank, where steam is separated and removed in line 34. Alternatively or supplementally, steam or vapor may be vented through a separate vent not shown to the atmosphere or drawn off directly from or in a similar vent associated with exit port 18 (FIGS. 1a and 1b). The steam may be recycled in a known manner for thermal energy preservation, for condensing to make substantially pure water, put to other useful purposes, or simply flashed to the atmosphere. Optionally a vacuum may be drawn on the flash tank to assist in removing the vapor and steam. It is not essential that the temperature of the fluid exiting from the SPR exceed the boiling point of water, as a vacuum assist can facilitate the withdrawal of vapors. Concentrated fluid from the flash tank, in line 35, can be recycled to the well, or analyzed in analyzer 50 in order to determine the best way to re-establish the ratios of ingredients, a desired crystallization temperature, a desired density, or other property. If needed according to the results of the analysis, or if desired for any reason, additives may be introduced from feeder 51. Where the steam or vapor is simply vented from the SPR, concentrated fluid from the SPR 30 may bypass the flash tank as in line 36, and some or all of this may be recycled through line 37 to the SPR according to a predetermined desired efficiency for the system, balancing flow rates, heat input, and concentrations. Another option is to combine the two blowdowns of concentrated fluid in lines 35 and 36, and work with them thereafter either to reuse them directly or to adjust the concentration of one or more constituents for a desired purpose. In yet another option, line 38 may recycle at least some of the fluid from the SPR for additional heat input from the Diesel Exhaust Heat Exchanger (or waste heat from the alternative power source where a Diesel engine is not used). Optional filters 40, 41, 43, 44, 45, 46, and 47 may be installed at various points in the system for various purposes; filter 40 on incoming line 32 may comprise a screen for larger solids. Filter 43 and filter 47 are of special interest because, contrary to practice with a distillation unit, the SPR passes all solids through it while removing water. In the case of a used brine which may have incurred some crystallization in spite of dilution, because of an imbalance in its constituents, the valuable crystallized components may be re-dissolved in the higher temperatures of the SPR and passed through, yet other solids are removed by the filter. Supplemental pumps and valves, not shown, may be deployed throughout the system to assure the desired flow rates and pressures, and to direct the fluids in the system to and through the various options described; automatic or manual controls for the valves and pumps may also be installed.

costs making a brine from beginning calcium bromide brines having densities ranging from 14.2 pounds per gallon to 15.1 pounds per gallon, by adding more calcium bromide ($CaBr_2$). The number of pounds of dry calcium bromide (salt) to be added is shown for each level together with an estimated cost of the calcium bromide. Table 2 shows the cost of the Diesel fuel required to achieve brines of the same densities by evaporation in the SPR without any additions to the brines at all. Savings are achieved not only in the cost of making up the denser brines but also, significantly, in the cost of inventory of the calcium bromide, which can be greatly minimized. Similar results are seen with cesium-containing fluids.

TABLE 1

DRY SALT ADDITION ESTIMATES

| Starting Gravity Lbs/Gal | Original Volume Bbls | Final Gravity Lbs/Gal | Final Volume Bbls | Dry Salt Added Lbs | Cost of Salt $ |
|---|---|---|---|---|---|
| 14.2 | 1,000 | 15.2 | 1074 | 89,806 | $134,709 |
| 14.3 | 1,000 | 15.2 | 1064 | 79,143 | $118,115 |
| 14.4 | 1,000 | 15.2 | 1057 | 70,352 | $105,528 |
| 14.5 | 1,000 | 15.2 | 1050 | 61,695 | $ 92,542 |
| 14.6 | 1,000 | 15.2 | 1044 | 53,589 | $ 80,384 |
| 14.7 | 1,000 | 15.2 | 1036 | 44,280 | $ 66,421 |
| 14.8 | 1,000 | 15.2 | 1028 | 35,366 | $ 53,048 |
| 14.9 | 1,000 | 15.2 | 1022 | 26,569 | $ 39,853 |
| 15.0 | 1,000 | 15.2 | 1014 | 17,733 | $ 26,599 |
| 15.1 | 1,000 | 15.2 | 1007 | 8,857 | $ 13,286 |

Note 1:

14.2 ppg Starting Cost $447.30/Bbl

Note 2:

$CaBr_2$ Dry $1.50/Lb

TABLE 2

CONCENTRATOR PERFORMANCE ESTIMATES

| Starting Gravity Lbs/Gal | Lb $H_2O$ to Evaporate Lbs | Final Volume of 15.2 ppg Fluid Bbls | Time to Concentrate Hrs | Diesel Fuel Required Gal | Diesel Cost $2/Gal |
|---|---|---|---|---|---|
| 14.2 | 56,000 | 846 | 56.0 | 1,848 | $3,696.00 |
| 14.3 | 49,700 | 863 | 50.0 | 1,650 | $3,300.00 |
| 14.4 | 43,000 | 877 | 43.0 | 1,419 | $2,838.00 |
| 14.5 | 38,000 | 893 | 38.0 | 1,254 | $2,508.00 |
| 14.6 | 34,700 | 900 | 35.0 | 1,155 | $2,310.00 |
| 14.7 | 27,200 | 920 | 27.0 | 891 | $1,782.00 |
| 14.8 | 19,000 | 940 | 21.0 | 693 | $1,386.00 |
| 14.9 | 16,000 | 954 | 16.0 | 528 | $1,056.00 |
| 15.0 | 9,500 | 970 | 9.5 | 314 | $ 628.00 |
| 15.1 | 5,500 | 980 | 3.5 | 181 | $ 362.00 |

Note 1:
Original Volume 1,000 bbls.
Note 2:
Does not include use of heat exchanger.

The following tables demonstrate the monetary savings available through the use of our invention. Table 1 shows the Our system can separate drilling fluid components from oil mud emulsions ranging from 1-95% oil and 99-5% water.

Preferably the oil is a heating oil or other oil chosen for a high boiling temperature; these are commonly used for oil mud emulsions. A typical used oil mud emulsion comprising 80% oil and 20% brine (including the dissolved components and including solids) is readily treated in our system since temperatures in the SPR can be regulated to achieve evaporation of the water in the flash tank downstream from the SPR while the oil, having a higher boiling temperature, passes through without difficulty even though it may be subjected to locally violent cavitation effects in the SPR. A mixture of oil and water exiting the SPR in line 33 will separate on entering the flash tank held at an appropriate temperature, the steam being flashed off through conduit 34, which may be a vent, and/or remaining in the upper space of the flash tank while liquid water including dissolved salts is held in the bottom of the tank and/or drains into line 35 or 39 or both. Since the emulsion is substantially broken, the liquid water in the flash tank is covered by oil which may be continuously or intermittently tapped through a drain not shown and used or stored elsewhere. Any of the non-vaporized water may also be drawn off of the flash tank in a different drain line not shown, augmenting the water vaporization process to remove water from the system Oil mud emulsions typically include significant amounts of solids—5% or 10% to 45% or more by weight of the overall composition—and our invention can handle such compositions without problems.

EXAMPLE

Oil Mud Emulsion

Using a 15" by 2" cavitation device, ten gallons of oil mud emulsion were treated to remove water. Initially the oil mud emulsion contained 18% water by volume, the balance being oil and solids typical of an oil well mud. The oil mud emulsion was sent through the cavitation device operating at 3600 RPM and recycled through the tank, which rapidly increased the temperature of the oil mud emulsion from room temperature to 240° F. Once that temperature was reached, the RPM of the cavitation device was controlled automatically in order to maintain an outlet temperature 240° F. At equilibrium, while recirculating the material and continuing to recycle through the tank, the speed was maintained at 1700 RPM, requiring about 13.5 HP. At 15 minutes, the material contained 13% water; at 30 minutes, it contained 10% water, and at 45 minutes the water was reduced to 5% by volume. Essentially none of the oil was evaporated Thus our invention is seen to include a method of reducing the water content of a used oil mud emulsion comprising heating the oil mud emulsion in a cavitation device, removing vapor or steam from the oil mud emulsion, and reusing at least a portion of the solids in the resulting concentrated oil mud emulsion in a new oil mud emulsion. The oil in the oil mud emulsion will have a boiling point higher than water, generally higher than 250° F. and frequently at least 280° F. Our process is quite capable of removing all the water from an oil mud emulsion of virtually any composition, leaving only the oil and solids components, both of which may be reused in a new oil mud emulsion.

Our invention also includes a method of conserving components of a used oil well fluid containing oil well fluid components comprising (a) concentrating the oil well fluid by passing the oil well fluid through a cavitation device to obtain a concentrated oil well fluid containing oil well fluid components in concentrations higher than the used oil well fluid, and (b) using the concentrated oil well fluid as a source of oil well fluid components for a new oil well fluid. The method may be repeated any number of times—that is, the ingredients of the oil well fluids may be recycled more or less indefinitely—and the used oil well fluid may comprise a workover fluid, a completion fluid, a drilling fluid, an oil mud emulsion, or any other oil well fluid including components of value or interest for recycling or reuse. The compositions may be adjusted by the addition of increments of their ingredients prior to reuse; also the fluid may be filtered prior to passing through the cavitation device, and the solids retained on the filter either reused or discarded, or both.

Our invention also includes a method of processing a used oil well fluid containing cesium comprising (a) optionally filtering the used oil well fluid (for example to remove cuttings from a drilling fluid), (b) passing the used oil well fluid through a heat exchanger to increase its temperature utilizing waste heat from an engine, (c) powering a cavitation device with the engine, (d) passing the oil well fluid through the cavitation device to further increase the temperature thereof, (e) passing the used oil well fluid into a flash tank to separate steam and vapor from the used oil well fluid and to obtain a concentrated fluid, (f) removing at least a portion of the concentrated fluid from the flash tank, and reusing the at least a portion of the concentrated fluid in an oil well. The fluid from step (d) or from the flash tank can be recycled to the cavitation device to increase its temperature.

Water which is vented from the SPR or recovered as vapor or otherwise from the flash tank may be condensed and used for fresh makeup of various solutions and new oil well fluids, as a source of fresh water for living quarters or otherwise on an offshore platform, and for any other use for which fresh or distilled water is conveniently used. In the form of steam or vapor, the moisture's heat energy may be used in a turbine or boiler for conversion to other types of energy, such as electrical energy.

Our invention also includes a method of treating a hydrocarbon producing formation comprising introducing into said formation through a well an oil well fluid containing at least 2.5% by weight cesium, whereby said fluid becomes diluted in said formation so that it contains less than 2.5% cesium by weight, circulating said fluid from said well, and passing at least a portion of said fluid through a cavitation device to remove moisture therefrom and produce a regenerated fluid containing at least 2.5% cesium by weight of said fluid.

The invention claimed is:

1. Method of upgrading a cesium containing solution containing less than 2.5% cesium by weight comprising passing said cesium containing solution through a cavitation device to remove water therefrom, thereby obtaining a solution containing a higher concentration of cesium.

2. Method of treating an oilfield well penetrating an earth formation comprising introducing into said well an oil well fluid containing cesium, whereby said fluid becomes diluted in or by said formation so that it contains less cesium in concentration, circulating said fluid from said well, and passing at least a portion of said fluid through a cavitation device to remove moisture therefrom and produce a regenerated fluid containing a higher concentration of cesium by weight in said fluid.

3. Method of claim 2 followed by filtering the regenerated fluid thus obtained.

4. Method of claim 2 including using said regenerated fluid as a source of cesium in a new oil well fluid.

5. Method of claim 2 wherein said moisture is in the form of vapor or steam and is removed through a vent on said cavitation device.

6. Method of claim 2 wherein after said fluid is passed through said cavitation device, at least a portion of said fluid is passed to a flash tank and said moisture is removed from said flash tank.

7. Method of claim 2 wherein heat energy is recovered from said regenerated fluid.

8. Method of claim 2 including recovering water vapor or steam from a vent in said cavitation device or optionally through a flash tank connected to said cavitation device, and recovering heat energy from said water vapor or steam.

9. Method of claim 2 including recovering water vapor or steam from a vent in said cavitation device or optionally through a flash tank connected to said cavitation device, condensing said water vapor or steam, and utilizing said condensed water vapor or steam as a source of fresh water.

10. Method of claim 2 wherein said used oil well fluid contains less than 2.5% cesium and wherein said regenerated fluid contains at least 2.5% cesium by weight.

11. Method of achieving a desired crystallization temperature in a used oil well fluid containing cesium comprising passing said used oil well fluid through a cavitation device, thereby obtaining a rejuvenated oil well fluid having a concentration of cesium greater than that of said used oil well fluid, and adding at least one salt to said rejuvenated oil well fluid in an amount calculated to obtain a desired crystallization temperature in said rejuvenated oil well fluid.

12. Method of claim 11 including filtering said used oil well fluid after passing it through said cavitation device.

13. Method of upgrading a cesium containing solution, said solution being obtained in a mining process and comprising less than 2.5% cesium by weight, comprising passing said cesium containing solution through a cavitation device to remove water therefrom, thereby obtaining a solution containing a concentration of cesium higher than 2.5% by weight.

14. Method of claim 13 including passing at least a portion of said cesium containing solution through said cavitation device more than once.

\* \* \* \* \*